United States Patent [19]
Savit

[11] 3,863,058
[45] Jan. 28, 1975

[54] APPARATUS FOR DIGITAL CORRELATION

[75] Inventor: Carl H. Savit, Houston, Tex.

[73] Assignee: Western Geophysical Company of America, Houston, Tex.

[22] Filed: Jan. 17, 1972

[21] Appl. No.: 218,284

[52] U.S. Cl.............. 235/152, 235/168, 235/181, 340/15.5 TA, 340/15.5 DP
[51] Int. Cl..................... G06f 15/34, G01v 1/36
[58] Field of Search .......... 235/152, 156, 164, 181, 235/168; 324/77 G, 77 J; 340/15.5 TA, 15.5 DP, 15.5 CC, 15.5 SC

[56] References Cited
UNITED STATES PATENTS

| | | | |
|---|---|---|---|
| 3,304,417 | 2/1967 | Hertz | 235/164 |
| 3,449,553 | 6/1969 | Swan | 235/152 X |
| 3,489,888 | 1/1970 | Wilhelm, Jr. et al. | 235/164 |
| 3,536,903 | 10/1970 | Goshorn et al. | 235/168 |
| 3,671,931 | 6/1972 | Loofbourrow | 340/15.5 DP X |

Primary Examiner—Joseph F. Ruggiero
Attorney, Agent, or Firm—Michael P. Breston

[57] ABSTRACT

A method and apparatus for serially correlating two discrete time series wherein the two series to be correlated are converted to floating point form to a base such as 2. The series are correlated using the exponents only. The two time series to be correlated are correlated by adding the corresponding exponents of the numbers which in their full form would have had to have been multiplied. The sums are segregated into two groups, those in which the corresponding numbers from the two series have the same sign, and those in which the numbers have opposite signs. The sums for each group are separately exponentiated to the same base as was used in forming the floating-point numbers. All exponentiated sums from the two groups are separately accumulated. The accumulated sums are algebraically added to form a final sum.

9 Claims, 1 Drawing Figure

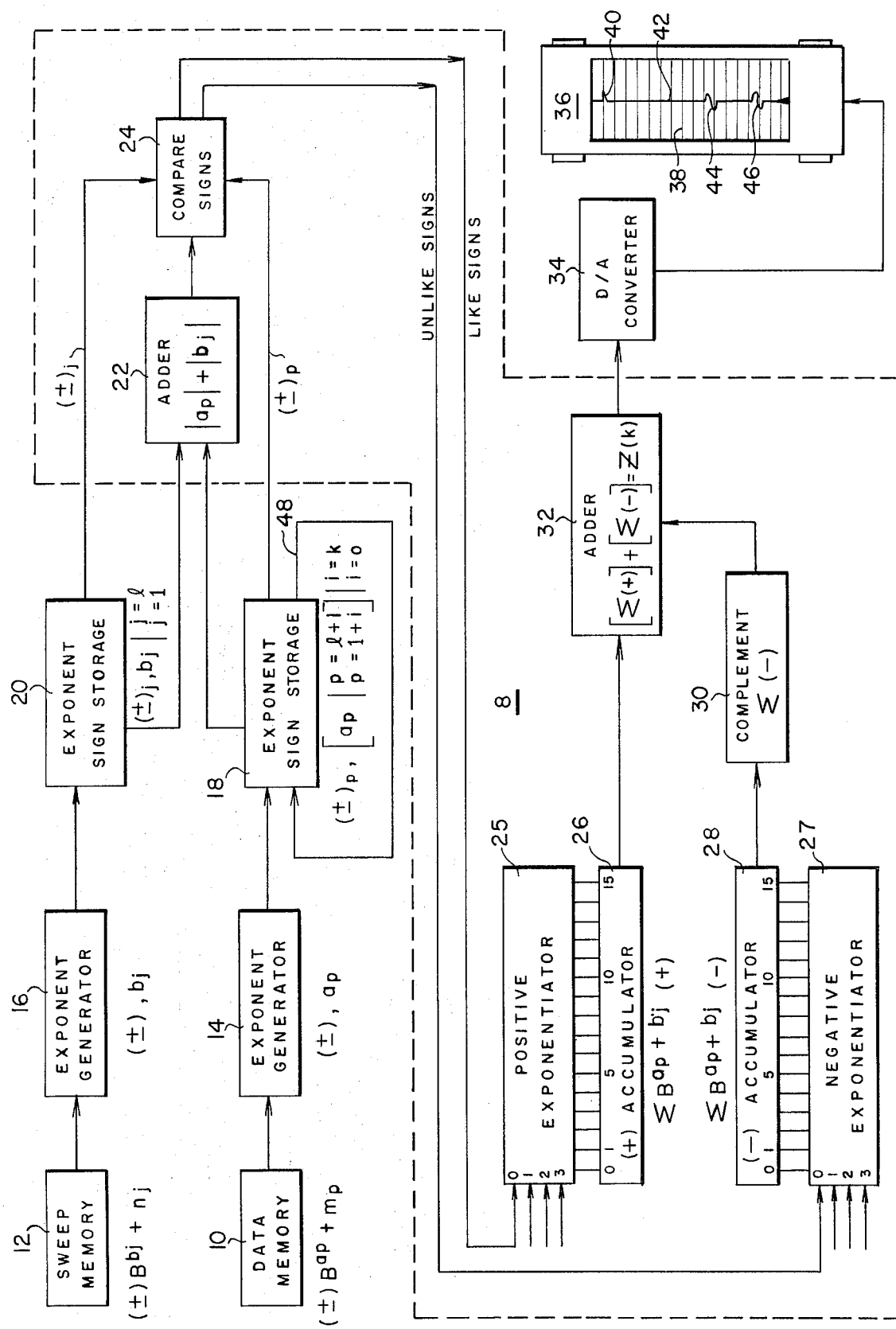

APPARATUS FOR DIGITAL CORRELATION

BACKGROUND OF THE INVENTION

In seismic exploration a seismic energy-source transducer injects a seismic signal into the earth. The signal travels downwardly and becomes reflected from subsurface formations. The reflected signal returns to the surface of the earth where it is detected by sensitive geophones which convert the reflected seismic signals to electrical signals and transmit the signals to a signal utilization device. The travel time delay between the time of injection of the original seismic signal and the time of reception of the reflected signals by the geophones is a function of the depth of the respective formations. Typically a maximum reflection-time delay on the order of several seconds is expected while reflections from shallower formations will arrive proportionately sooner.

In one method of seismic exploration, the seismic energy source transducer produces a sweep signal. The sweep signal is a unique wave train that is non-repetitive during a period which is at least as long as the maximum travel-time delay. The sweep-signal wavetrain will be reflected from several subsurface formations. Seismic signals received by the geophones will be a complex wave train containing succesively overlapping images of the original sweep signal. The beginning of each of the overlapping images will be shifted in time from the instant of initiation of the sweep signal in proportion to the vertical depth of the formations.

Useful information from the complex, reflected wavetrain is obtained by serially-correlating that wavetrain with a replica of the original sweep signal. From the results of serial-correlation, a correlogram can be constructed. The time delays to successive correlogram peaks are functions of the depths of each reflector. Methods and apparatus for practicing this technique of seismic exploration are very well known to the art; see for example, U.S. Pat. No. 2,688,124.

In the field, it is essential that the geophysicist be able to make a preliminary interpretation of the seismic data while the seismic exploration is being conducted. Similarly it is important that the operating technician be able to monitor the functioning of the equipment. Inasmuch as the raw seismic data as recorded in the field cannot be interpreted by simple inspection, a field correlator must be provided.

Seismic data are customarily expressed, recorded, and manipulated as binary numbers with a typical resolution of 15 bits plus a sign bit. A typical reflected time-series may have a 24-second duration and a 4-ms sample rate. Therefore, a conventional field correlator may require storage for 6,000 16-bit data samples for the reflected data. Memory for 3,000 16-bit samples may be needed to store the original 12-second sweep signal and an additional 3,000 32-bit locations may be needed as buffer storage for the integrated crossproducts. It is apparent therefore that a tremendous amount of bulk digital storage is needed to handle the correlation computations.

Large digital computers, such as are found in a central data-processing center, equipped with array processors can handle serial-correlation problems without difficulty. For a field correlator, however, the physical size of the required bulk storage, the expense of the hardware, and field time lost in making the computations requiring manipulation of 16 and 32-bit numbers render present state-of-the-art field correlators complicated, expensive, or very slow. Alternative prior-art field correlators use crude approximations, typically only 4 or 8 bits of the 16-bit seismic and sweep-datawords, in order to reduce storage requirements. The resulting correlograms lack resolution.

Seismic data are recorded in the field as digital, floating-point, computer-compatible numbers on magnetic tape. Customarily in computer operations, a floating-point number includes an algebraic sign, a positive exponent to a selected number base, and a mantissa. Before these numbers can be processed by conventional field correlators, it is necessary to normalize the floating-point numbers to fixed-point binary integers. The hardware needed for normalization is complicated and expensive; furthermore, field-correlator computation-time is necessarily increased.

There is a need therefore for a serial-correlation method for field use that will be rapid and require only inexpensive, compact hardware. This need can be filled by reducing the size of the required data-storage capacity, simplifying the arithmetic, and eliminating the need for conversion of floating-point numbers to integers.

SUMMARY OF THE INVENTION

In a broad aspect of this invention two continuous oscillatory signals are sampled at preselected intervals and the samples are converted to floating-point numbers formatted in a preselected bit pattern. A floating-point number includes an algebraic sign, a positive exponent to a base, and a mantissa.

The exponents of the floating-point numbers are adjusted to cause the mantissas of the samples to lie within a narrow numerical range close to unity. As the signal varies, therefore, the mantissa remains substantially constant while the exponent varies to track variations in signal amplitude. Hence, two time-series or number sequences whose elements are samples of an oscillatory electrical signal can be serially-correlated by arithmetically manipulating the exponents and algebraic signs instead of the actual data values. Neglecting the mantissa in the computations is equivalent to assuming that all mantissas are equal to one, i.e., the apparatus of the present invention effectively sets all mantissas to the value one.

In a specific embodiment of this invention, the absolute values of the exponents of each of the corresponding elements or component values from the two time series are first added. The sums are then exponentiated to the original floating-point number base. Algebraic signs (polarities) of the original sample values are multiplied and their product applied to the respective exponentiated sums. The exponentiated, signed sums are exponentials are then algebraically added to compute the covariance or correlation values.

It is an object of this invention to provide a rapid field correlator that requires a minimal amount of digital storage and hardware, and that requires only the elementary arithmetic operations of adding, shifting, comparing, and complementing.

BRIEF DESCRIPTION OF THE DRAWING

The sole FIGURE shows a flow diagram of a preferred correlator for use in practicing this invention.

DETAILED DESCRIPTION OF THE INVENTION

Serial-correlation of two time series may be better understood by a brief mathematical review. For example, let two continuous oscillatory electrical signals such as a reflected wave train and a sweep signal be sampled at preselected time intervals. Let the voltage level of each sample be converted to a digital number representative of the magnitude thereof and then tabulated as in Table 1 in an ordered array to form two discrete time-series having $l+k$ and $l$ elements respectively. Typical elements $x_p$ and $y_j$ of the two series may be expressed as binary integers.

TABLE 1

| | Reflected Signal | Sweep Signal |
|---|---|---|
| | $X_1$ | $Y_1$ |
| | $X_2$ | $Y_2$ |
| | $X_3$ | $Y_3$ |
| | $X_4$ | . |
| | $X_5$ | . |
| | $X_6$ | $Y_j$ |
| | . | . |
| | $X_j$ | $Y_l$ |
| | . | |
| | $X_p$ | |
| | . | |
| where p=i+j | $X_{l+k}$ | (i = phase lag |
| | | (j = running index. |

The covariances Z(k) are computed from:

$x_1 y_1 + x_2 y_2 + x_3 y_3 + ... + x_l y_l = Z(0)$ (1)
$x_2 y_1 + x_3 y_2 + x_4 y_3 + ... + x_{l+1} y_l = Z(1)$ (2)
$x_3 y_1 + x_4 y_2 + x_5 y_3 + ... + x_{l+2} y_l = Z(2)$ (3)
.
$x_k y_1 + x_{k+1} y_2 + x_{k+2} y_3 + ... + x_{l+k} y_l = Z(k)$, or in general:

$$\sum_{j=1}^{l} x_p \cdot y_j = Z(i) \quad (i=0, 1, 2, \ldots, k) \quad (4)$$

A high numerical value of $Z(i)$ at the $i^{th}$ interval implies a high degree of association between the two time series at the time corresponding to the $i^{th}$ sample.

Running index $i$ may be defined as the phase lag between corresponding elements or data samples forming the two time series. If $i = 0$, there is no relative displacement between corresponding elements of the two series; if $i = 1$, there is a one-element relative displacement between the corresponding elements of the two time series. It follows that, assuming the original continuous signals to be sampled at 0.004-second intervals, if $i = 4$, the phase lag or displacement between the two series is 16 milliseconds or 4 sample intervals. Sampling of the two continuous oscillatory signals is commenced at the instant of initiation of the sweep signal. Hence i multiplied by the sample-interval time is the time elapsed since initiation of the sweep signal. A graph of $Z(i)$, plotted as a function of phase lag $i$ (i.e., as a function of time), yields a correlogram, whose peaks may be, for example, indicative of the arrival times reflected seismic wave trains.

Those skilled in the mathematical art will recognize that the values of $Z(i)$ are the inner products (dot products) of the vectors $x_j$ ($j = i+1$ to $j = i+l$) and $y_j$ ($j = 1$ to $j = l$). Thus, the present invention may be used generally in all instances in which an inner product of vectors is required. The mathematics of serial correlation are discussed more fully in the "Handbook of Probability and Statistics," Burlington and May Handbook Publishers Inc., Sandusky, Ohio, 1958.

Seismic data are recorded in the field on magnetic tape as digital floating-point numbers consisting of a sign, a mantissa, and an exponent of a preselected base. Binary-integer values for $x_p$ (where $p = i+j$) and $y_j$ may be expressed in floating-point form as $$x_p = (\pm) B^{a_p} \times m_p,$$
$$y_j = (\pm) B^{b_j} \times n_j,$$

where $m_p$ and $n_j$ are mantissas having a value near to 1, B is a number-system base such as 2, 8, 16, or other base, and $a_p$ and $b_j$ are the exponents. Prior to recording on tape, the $m_p$ and $n_j$ were constrained to remain within a narrow numerical range close to unity. For the purposes of this invention the $m_p$ and $n_j$ may be considered to be constants. So long as the mantissas remain substantially constant, variations in $x_p$ and $y_j$ will be represented by variations in the values of $B^{a_p}$ and $B^{b_j}$.

It is evident that the cross products of equation (4) can be computed by adding the absolute values of the exponents and exponentiating the resulting sums to form an exponential. The data-sample signs of the respective time-series are separately multiplied and applied to the exponentials to form the signed cross-products. This step can be conveniently performed by means of a sign comparator. If the signs of a pair of data are alike, the exponentials are transferred to a positive accumulator or integrator; if the signs are unlike, the exponentials are transferred to a negative accumulator, or integrator. When all of the exponents have been summed, exponentiated, and accumulated, the contents of the two accumulators are added to compute a covariance value $Z(i)$.

Thus, if B is assigned the value 2, the value for X(o) in equation (1) is computed from $Z(o) = \{\text{sgn}(x_1)\ \text{sgn}(y_1)\}\ 2^{a_1 + b_1} + \{\text{sgn}(x_2)\ \text{sgn}(y_2)\}\ 2^{a_2 + b_2} + \{\text{sgn}(x_3)\ \text{sgn}(y_3)\}\ 2^{a_3 + b_3} + ... + \{\text{sgn}(x_l)\ \text{sgn}(y_l)\} 2^{a_l + b_l}$ (5)

where the expressions in braces symbolize the cross-multiplied signs of the respective data values.

A better understanding of the method of this invention may be gained by study of a numerical example. Assume floatingpoint values for the first three terms of the $x_p$ and $y_j$ to be

TABLE 2

| p,j | x | y |
|---|---|---|
| 1 | $-(2^5 \times c)$ | $-(2^2 \times c)$ |
| 2 | $+(2^6 \times c)$ | $-(2^5 \times c)$ |
| 3 | $-(2^9 \times c)$ | $+(2^4 \times c)$ | where $c$ is a substantially constant mantissa whose value is approximately one and which will be ignored.

In a preferred embodiment of this invention the decimal exponents in Table 2 are expressed as binary integers which may be summed in a simple 4-bit adder. Signs of the respective data values are cross-multiplied as in Table 3

TABLE 3

| sgn(x) | a | sgn(y) | b | sgn(x) sgn(y) | a+b |
|---|---|---|---|---|---|
| − | 0101 | − | 0010 | + | 0111 |
| + | 0110 | − | 0101 | − | 1011 |
| − | 0001 | + | 0100 | − | 0101 |

The summed exponents are exponentiated; that is, the base 2 is raised to the power indicated by the summed exponents. The cross-multiplied signs are applied to the exponentiated sums and the resulting terms are integrated to form the sum of the products Z of the original series. Exponentiation and integration of the data from Table 3 is illustrated below, assuming use of a 16-bit accumulator for integration and two's-complement notation for negative numbers:

$$Z(0) = \begin{array}{r} 0000000010000000 \\ 1111000000000000 \\ \underline{1111111111000000} \\ 1111000001000000 \end{array}$$

In decimal notation the binary value of Z(0) is −4032. This number, for example, may represent digitally, a certain fraction of a full-scale analog voltage. Using 10-volt logic and a 16-bit digital-to-analog converter, the number −4032 represents −2.5 volts.

From this brief mathematical discussion it is clear that serial correlation of two discrete time-series can be accomplished by addition, exponentiation, and integration without recourse to multiplication. All of the operations can be performed by means of adders, decoders, accumulators, and comparators. It is now possible to build a simple field correlator requiring only inexpensive components and minimal storage requirements.

Seismic data ranges are such that floating-point exponents can be expressed by 4-bit binary numbers. Thus storage requirements for data and sweep arrays are reduced by three-fourths as compared to conventional 16-bit fixed point data. Because the seismic data samples, in present day seismic field instruments, are determined as floatingpoint numbers having substantially constant mantissas, which are transmitted to a recording unit for storage on an archivalstorage medium such as a magnetic tape, it is a simple matter to intercept or to play back only the data signs and exponents for direct use. This invention eliminates the need to denormalize floating-point numbers to binary-integer format prior to correlation, as was required by the prior art.

It is recognized that the correlations computed by means of the present invention will not be exact since the individual values to be correlated are expressed as rather crude approximations. For example, setting all mantissas to the value one may produce an error in a single sample of 2 to 1. Some additional precision may be obtained by rounding rather than truncating. For example, truncating when using base 2 means constraining the mantissa to fall between 1/2 and 1 while (multiplicative) rounding means constraining the mantissa to be between ½ ⁄ 2 and ⁄ 2. An intermediate rounding may be achieved by constraining the mantissa to lie between 3/4 and 1 1/2. When, however, such approximations are used in calculating the correlations of the very long signals involving many thousand samples such as are customary in seismograph prospecting, it has been found that the error of the correlogram averages out to less than 2 percent, a precision more than satisfactory for visual monitoring of correlograms in the field.

Referring now more specifically to the drawing there is displayed a flow-diagram of a preferred correlator for practice of this invention.

There is shown a data-memory 10 and a sweep-memory 12: data-memory 10 may be a magnetic tape containing prerecorded seismic data which is expressed as a plurality of floating-point numbers forming the elements of a first, discrete, time series, and sweep-memory 12 may be a prerecorded magnetic tape containing the sweep signal expressed as a second plurality of floating point numbers which form the elements of a second discrete time series. Data-memory 10 may contain as many as 6,000 floating point numbers or elements whose values are representative of the sampled amplitudes of a continuous 24-second seismic wave train. Ordinarily, sweep-memory 12 will contain approximately one half as many samples. Symbolically, the number of floating-point numbers or elements making up the first discrete time series may be expressed as K, while the number of elements in the second series is L. These figures are offered by way of example and in no way restrict the scope of this invention.

Data-sample pairs from data-memory 10 and from sweep-memory 12 are transferred to exponent generators 14 and 16 where the signs of the data-values and the exponents $a_p$ and $b_j$ are stripped from the floating-point numbers. The signs and exponents are transferred to data-exponent storage 18 and to sweep-exponent storage 20. These respective signs and exponents are stored in an ordered array corresponding to their respective positions in the original time-series representing the data. Each storage location for the $a_p$ and $b_j$ includes five bits. Four bits are used to represent the numerical exponent value, the fifth bit is the sign bit for each sample.

A correlator is provided, generally shown as 8 and enclosed by dashed lines. Correlator 8 includes an adder 22, sign comparator 24, exponentiators 25 and 27, accumulators 26 and 28, complementer 30 and adder 32.

After the data-exponent storage 18 and sweep-exponent storage 20 have been filled with the $a_p$ and $b_j$ respectively, the absolute values of a first pair of exponents $a_1$ and $b_1$ are respectively added together in adder 22. Simultaneously with the add-operation, the signs attached to $a_1$ and $b_1$ are compared in sign comparator 24. If the signs of the two values are alike, the contents of adder 22 are transferred to positive exponentiator 25. If the signs of the two values are unlike, the contents of adder 22 are transferred to negative exponentiator 27.

In a preferred embodiment, each of exponentiators 25 and 27 may be a 1-of-16 decoder such as a Fairchild 9311 chip. This decoder accepts a 4-bit input and produces 16 mutually exclusive outputs; the particular output depends on the comernation of the four input bits. For example, if following the add operation, 4-bit adder 22 contained the bit comernation 0101, a signal would appear on line 4 of one of the exponentiators 25 or 27. As explained previously, the choice depends upon the results of the data-sign comparison. If the selected base B is 2, the exponentiated sum or exponential would be $2^5$. Appearance of a signal on an output line of one of exponentiators 25 or 27 sets a corresponding bit in one of the 16-bit accumulators, either 26 or 28.

Next are added the absolute values of a second pair of exponents $a_2$ and $b_2$, their signs compared, the sum transferred to the appropriate exponentiator, and the exponential is integrated with previous data in the appropriate accumulator. The steps of addition, sign comparison, exponentiation, and accumulation or integration are repeated until all of the $a_p$ and $b_j$ have been processed.

The sum accumulated in accumulator 28 is now complemented in two's complement form and is added to the contents of accumulator 26 in adder 32 to compute a first covariance $Z(o).Z(o)$ $Z(10)$ may be converted from a digital number to an analog voltage by a digital-to-analog converter and then recorded as a first point on a correlogram 36.

Following computation of $Z(o)$, the $a_p$ in data exponent storage 18 are shifted one sample interval by shift-line 48. The shifted $a_p$ are now added to the unshifted $b_j$ in adder 22. The signs are similarly compared in sign comparator 24 and the output from adder 22 exponentiated in exponentiator 25 or 27 and the exponentials are integrated in accumulators 26 or 28. The second set of numbers is then added in adder 32 and displayed on correlogram 36 as a second value of covariance $Z(1)$. The contents of data-exponent storage 18 are again shifted one interval and a third covariance value $Z(2)$ is computed and displayed on correlogram 36. The complete process of addition, sign comparison, exponentiation, accumulation, final summation, display, and shifting is repeated (K-L) times and results in the serial correlation of the two discrete time series.

Alternatively, the correlogram values $Z(i)$ may be stored in digital form on a suitable medium, as on magnetic tape, and converted to visual form in a subsequent step.

On correlogram 36, timing lines 38 mark equal time intervals such 0.050 second. The sweep initiation instant is recorded as a sharp peak 40 on correlogram-trace 42 by circuitry not shown. The elapsed times between the sweep initiation instant, marked by peak 40, and correlogram peaks 44 and 46, are the reflection delay times to two respective reflecting horizons.

Serial correlation of a single seismogram may require one half million operations involving adding, comparing, shifting, and exponentiating of binary numbers. In a typical field operation, such correlograms must be produced at intervals of 3 to 5 minutes. To be useful as a field correlator, the electronic components must have cycle times below the micro-second range in order to produce a meaningful correlogram in real time. It is apparent that mechanical or manual implementations of the serial-correlation process would be impracticable.

It is to be understood that the block diagram of the drawing is intended to be illustrative of the basic principles of the present invention. In actual implementation it may, for example, prove convenient to use but one exponentiator and to use time-sharing techniques to differentiate the positive and negative values. Similarly, the functions of the accumulators 26 and 28 and of adder 32 may be combined in one accumulator by inserting complementer 30 between negative exponentiator 27 and the combined accumulator-adder. Similarly, the simple 4-bit adder 22 and 16-bit decoders 25 and 27 may be replaced by a 4-bit adder with carry output in conjunction with 32-bit decoders.

While this invention has been described with specific reference to seismographic exploration, it will be apparent that the invention may be applied to any art requiring serial correlation of discrete time series.

What is claimed is:

1. A compact digital apparatus for determining the degree of association between two time series of digital quantitites expressed in floating-point form wherein each component value of said two time series consists of a sign, an exponent, and a mantissa comprising:

means to remove the signs and exponents from the component values of said two time series; and correlator means coupled to said removing means for using said signs and exponents to correlate said two time series, said correlator means including an adder means for adding the absolute values of said exponents in pairs, one of said pairs of exponents being selected from one time series and the other of said pairs being selected from the other time series.

2. The apparatus of claim 1, wherein said correlator means includes:

comparator means coupled to said adder means to compare the sign of each one of said pairs of exponent values with the sign of each other of said pairs of exponents;

positive exponentiator means coupled to said comparator means to exponentiate said pairs of added exponent values having like signs to form a plurality of positive exponents;

and negative exponentiator means coupled to said comparator means to exponentiate said pairs of added exponent values having unlike signs to form a plurality of negative exponentials.

3. The apparatus of claim 2 wherein said correlator means includes:

positive accumulator means and negative accumulator means interconnected with said exponentiator means to form the cummulative sum of said positive and negative exponentials.

4. The apparatus of claim 3 wherein said correlator means further includes:

complementer means interconnected with said negative accumulator means to complement the negative sum; and adder means coupled to said complementor and said positive accumulator to add said positive and complemented negative sums to form a covariance value.

5. The apparatus of claim 4 and including:
means to store said covariance value.

6. The apparatus of claim 4 and including:
means interconnected with said adder means to display said covariance value as a visual recording.

7. The apparatus of claim 1 wherein said correlator means further including:
exponentiator means for exponentiating the sums produced by said adder means.

8. The apparatus of claim 7 wherein said correlator means further including:
means for determining the sign appropriate to each exponentiated sum produced by said exponentiator means.

9. The apparatus of claim 8 wherein said correlator means further including:
accumulator means for accumulating said exponentiated sums in accordance with said determined signs.

* * * * *